(12) United States Patent
Jasperneite et al.

(10) Patent No.: US 6,421,710 B1
(45) Date of Patent: Jul. 16, 2002

(54) COUPLING ARRANGEMENT FOR A MASTER-SLAVE BUS SYSTEM

(75) Inventors: Jurgen Jasperneite, Steinheim; Kai Fechner, Barntrup; Volker Detert, Kirchlengern, all of (DE)

(73) Assignee: Pheonix Contract GmbH & Co (DE)

( * ) Notice: Subject to any disclaimer, the term of this patent is extended or adjusted under 35 U.S.C. 154(b) by 0 days.

(21) Appl. No.: 09/242,527
(22) PCT Filed: Jun. 23, 1998
(86) PCT No.: PCT/EP98/03818
§ 371 (c)(1),
(2), (4) Date: Mar. 23, 1999
(87) PCT Pub. No.: WO98/59466
PCT Pub. Date: Dec. 30, 1998

(30) Foreign Application Priority Data

Jun. 24, 1997 (DE) .......................................... 197 26 763

(51) Int. Cl.⁷ .............................................. G06F 15/16
(52) U.S. Cl. ....................... 709/208; 709/221; 709/253; 710/103; 710/110
(58) Field of Search .................................. 710/100–102, 710/103, 104, 110, 109; 713/1, 2, 100; 709/208, 209, 221

(56) References Cited

U.S. PATENT DOCUMENTS

| 5,136,583 | A | * | 8/1992 | Kondo ..................... 370/85.15 |
| 5,386,567 | A | * | 1/1995 | Lien et al. .................. 713/100 |
| 5,758,073 | A | * | 5/1998 | Liang et al. ................ 709/230 |

* cited by examiner

*Primary Examiner*—Dung C. Dinh
*Assistant Examiner*—Kimberly Flynn
(74) *Attorney, Agent, or Firm*—Charles E. Baxley

(57) ABSTRACT

An arrangement for coupling bus subscribers and bus masters in a master-slave bus system which has a ring topology and in which the bus subscribers are coupled actively without subscriber addresses and in which the bus subscribers are each allocated a bypass element which causes a brief interruption in data interchange and makes the bus master to interrogate addresses for restructuring purposes when the associated slave subscriber is decoupled and coupled. The bypass elements each have an address store which can be selected only in the event of the address interrogation and which is inactive during data interchange.

7 Claims, 1 Drawing Sheet

COUPLING ARRANGEMENT FOR A MASTER-SLAVE BUS SYSTEM

FIELD OF THE INVENTION

The present invention relates generally to the field of bus systems and more particularly to an arrangement for coupling bus subscribers and bus masters in a master-slave bus system which has a ring topology and in which the bus subscribers, or slave subscribers, are coupled actively without subscriber addresses.

PRIOR ART

Bus systems having a ring topology and active subscriber coupling, as shown in German Patent DIN E 19258, generally do not have the facility for removing individual bus subscribers from the overall system or for adding them to it. Up to now, such a capability has been offered only by bus systems having a linear topology and passive subscriber coupling, in accordance with German Patent DIN 19245. The physical characteristics of the latter bus systems allow the connection and disconnection of a subscriber without the whole system being brought to a standstill.

In other types of ring systems, namely computer networks, so-called bypass elements are familiar tools for producing a bridge when a subscriber is removed from the ring. However, these devices are used exclusively for increasing the availability of the ring system, the recovery time of the system being of secondary importance in this case. The situation is different for bus systems because the concern here is not to interrupt data transmission between the interconnected computer or control systems with a wide range of configurations, otherwise it will be necessary to establish not only the data link but also the operation of the control systems all over again.

OBJECTS AND SUMMARY OF THE INVENTION

It is therefore an object of the present invention to provide a coupling arrangement for a master-slave bus system in which, in the event of a disruption, such as in the case of a slave subscriber being coupled, decoupled or experiencing a fault, the rapid and direct driving without subscriber addresses is interrupted only so briefly that the control or computer systems connected via the bus system are not affected.

The foregoing and other objects and advantages of the present invention will appear more clearly hereinafter. In accordance with the present invention there is provided a coupling arrangement for a master-slave bus system in which each slave subscriber in a ring topology is allocated a bypass element. This bypass element is used to make the bus master, when the associated slave subscriber is decoupled and coupled, briefly interrupt direct data interchange with the slave subscribers and perform address interrogation for the purpose of restructuring the protocol execution, to which end the bypass elements have an address store which can be selected only in the event of this address interrogation and is inactive during data interchange.

In the master-slave bus system which is suitable for extremely fast data transmission and in which the bus subscribers are coupled actively without subscriber addresses, the removal, change or failure of one of the slave subscribers causes only a brief restructuring of the protocol execution which, appropriately without feedback, does not affect the connected control or computer systems. After restructuring of the ring system, which is not interrupted physically on account of the bypass elements present according to the invention, data interchange between the bus master and the slave subscribers continues, it being possible for the altered ring topology to be included in the bus master's protocol execution from the outset after the occurrence of a fault.

The bypass elements can either be arranged physically separate from the respectively associated slave subscriber or they can be integrated in the latter such that it is still possible to exchange the slave subscriber on its own, as is necessary when there is a fault. The crucial factor is that the ring topology of the bus system is retained by virtue of the bypass elements being connected to one another via forward and return data channels.

In order that the slave subscriber can be included in the data interchange of the ring system, it is connected to the allocated bypass element via a reception data line and via a transmission data line. In addition, between each slave subscriber and the associated bypass element, there is a connection via a control line which is used to pass either a decoupling signal or a coupling signal to the bypass element, depending on which state change is currently occurring.

The address stores which can be read by the bus master are each arranged in the bypass elements, but preferably cannot be called up directly from there. Hence, in an expedient refinement of the invention, the address stores of the bypass elements are each connected to the associated slave subscriber by means of an interface so that the address stores can be read only via this slave subscriber when coupled. If the address store cannot be accessed by the bus master because the slave subscriber is not present or has a fault, it is not necessary for the data in the address store of the absent slave subscriber to be additionally evaluated again for protocol execution to continue in the bus master.

Advantageously, the bypasses are constructed using a permanent passive circuit which does not require a specific voltage supply.

DESCRIPTION OF THE DRAWINGS

Other important objects and advantages of the present invention will be apparent from the following detailed description taken in connection with the accompanying drawings wherein like numerals refer to like parts and in which.

DETAILED DESCRIPTION OF THE INVENTION

Figure 1:
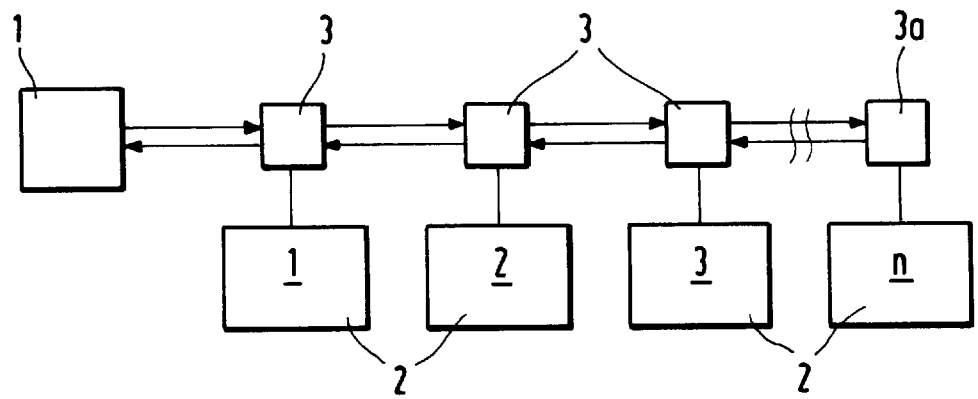
FIG. 1 shows a schematic illustration of a master-slave bus system which incorporates the coupling arrangement according to the present invention.
Figure 2:
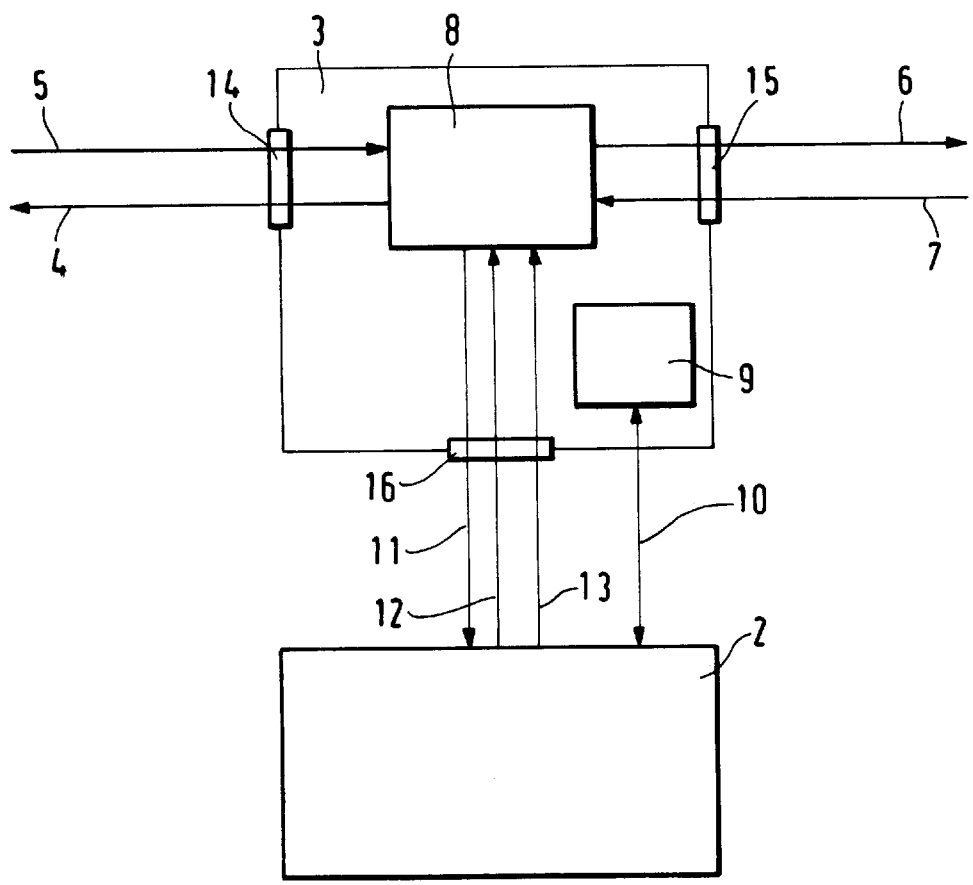
FIG. 2 shows a schematic illustration of one of the slave subscribers of the master-slave bus subscribers of FIG. 1.

With reference to the drawings, wherein like reference numbers designate like or corresponding parts throughout, there is shown in FIGS. 1–2 a coupling arrangement for a master-slave bus system made in accordance with the present invention.

FIG. 1 specifically shows a central bus master 1 which is used to control the so-called bus access process for the system as a whole. The number of associated slave subscribers 2 can differ. For example, the individual slave subscribers 2 in FIG. 1 are numbered according to their physical sequence. The slave subscribers 2 are not connected directly to the bus cable which makes the connection to the bus master 1, but rather each of the slave subscribers 2 have a bypass element 3 allocated to them, which is added to the bus cable with the forward and return data lines in the style of a four-terminal network. The bus element 3a of the slave subscriber which is last in physical terms closes the ring of the bus system constructed with a ring topology. Because of the unambiguous physical position of the slave subscribers 2, no specific addressing method is required for this master-slave bus system shape. However, it is still necessary for the bus master 1 to be able to recognize whether the individual slave subscriber 2 is coupled, decoupled or has failed due to a fault, for example, and the bypass elements 3 which remain permanently in the ring bus system are used for this purpose.

The components necessary for the bypass element 3 can be seen in FIG. 2. The data channel 5 arriving from the previous slave subscriber or from the bus master and, accordingly, the data channel 4 returning there are routed into the bypass element 3 via an interface 14. The bypass element 3 has a continuing interface 15 via which the data channel 6 leading to the slave subscriber which comes next in physical terms, as well as the data channel 7 returning from it, are connected. The data channels 4, 5 and 6, 7 are connected to a bridge element 8 which is connected to the associated slave subscriber 2 via a further interface 16. A reception data line 11 and a transmission data line 12 are connected via this interface 16 to the slave subscriber 2 and from there back to the bridge element 8. In addition, another control line 13 is connected between the slave subscriber 2 and the bridge element 8 via the interface 16 and, independently of this, there is a fourth interface 10 which connects the slave subscriber 2 to an address store 9 in the bypass element 3.

If the slave subscriber 2 is actively coupled into the ring system, at the incoming interface 14, the transmitted data stream from the physical predecessor in the ring system is supplied transparently to the slave subscriber 2 via the reception data channel 5, through the bridge element 8 and the reception data line 11 from the interface 16 of the bypass element 3. The transmitted data stream for the physical successor of the slave subscriber 2 is supplied by the transmission data channel 6 via the transmission data line 12 and via the continuing interface 15 of the bypass element. Conversely, the transmitted data stream from the physical successor at the continuing interface 15 of the bypass element 3 is supplied transparently via the reception data channel 7 to the respective physical predecessor via the transmission data channel 4 of the incoming interface 14.

The control line 13 is used to inform the bridge element 8 of the instruction as to whether the slave subscriber 2 is coupled or decoupled. In this case, a low state on the control line 13 is a request to connect the incoming interface 14 to the continuing interface 15 of the bypass element in the bridge element 8, which removes the slave subscriber 2 from the ring bus system. Accordingly, a high state on the control line 13 signals the addition of the slave subscriber 2 to the ring system. Criteria for removing the slave subscriber 2 from the ring bus system can be the absence of the supply voltage at the slave subscriber 2, or the physical removal of the slave subscriber 2 owing to an operational requirement. Decoupling of the slave subscriber 2 can also be initiated by means of the control line 13 on the basis of self-monitoring in a fault state.

According to the invention, essentially no device addresses for data transfer are required and provided in the ring bus system for the slave subscribers 2. In this case, there are only identification codes which are identical for slave subscribers having the same functionality. To distinguish whether or not the individual slave subscriber 2 is present when there are a number of such identical slave subscribers 2, the cited address store 9 in the bypass element 3 is required. This address store 9 is used for non-volatile storage and interrogation of a number which is allocated by the bus master 1 and is read from the address store 9 located in the bypass element 3 via the slave subscriber 2 by means of the physical interface 10. This address coding can take place by means of customary message transmission cycles when the bus system is started up. As a result, the bus master 1 can unambiguously differentiate the added or removed state of the respective slave subscriber 2 from other identical slave subscribers 2.

After the installation phase, in which the connected slave subscribers 2 were detected and a device address was transmitted to them, the bus master 1 starts cyclic data interchange with all the connected bus subscribers 2. Should a decoupling or coupling procedure be initiated for a bus subscriber 2 in this steady-state operating phase, the bus master 1 uses an appropriate method of system diagnosis to determine this change in the ring bus system and identifies the decoupled or coupled bus subscriber 2 by interrogating all the device addresses and running a comparison with the previous device address list. Cyclic data interchange continues after the subscriber lists in the bus master 1 have been reorganized, this reorganization varying in complexity depending on the transmission protocol.

The foregoing specific embodiments of the present invention, as set forth in the specification herein, are for illustrative purposes only. Various deviations and modifications can be made within the spirit and scope of this invention, without departing from the main theme thereof.

What is claimed is:

1. A coupling arrangement for a master-slave bus system having a ring topology, comprising:
    a) a plurality of slave subscribers;
    b) a plurality of bypass elements with said plurality of bypass elements allocated, one each, to said plurality of slave subscribers;
    c) an address store disposed in each of said bypass elements, with said address store selectable only in the event of address interrogation and inactive during data interchange, with said bypass element capable of causing a brief interruption in data interchange and causing said bus master to interrogate addresses in said address store for restructuring when said slave subscriber is decoupled and coupled; and
    d) an interface with said interface connecting said slave subscriber and said address store, with said address store readable by said bus master via said slave subscriber when coupled, and with said bus master writeable into said address store located in said bypass element of said slave subscriber.

2. The coupling arrangement as claimed in claim 1, further comprising:
    forward and return channels disposed connecting said bypass elements.

3. The coupling arrangement as claimed in claim 1, in which said bypass elements comprise:
    a passive circuit arrangement.

4. The coupling arrangement as claimed in claim 1, further comprising:
    a reception line connecting each of said slave subscribers and said bypass elements;
    a transmission line connecting each of said slave subscribers and said bypass elements; and a control line connecting each of said slave subscribers and said bypass elements with said control line passing a coupling or a decoupling signal to said bypass element.

5. A coupling arrangement for a master-slave bus system having a ring topology, comprising:

a) a plurality of slave subscribers;

b) a plurality of bypass elements with said plurality of bypass elements allocated, one each, to said plurality of slave subscribers;

c) an address store disposed in each of said bypass elements, with said address store selectable only in the event of address interrogation and inactive during data interchange, with said bypass element capable of causing a brief interruption in data interchange and causing said bus master to interrogate addresses in said address store for restructuring when said slave subscriber is decoupled and coupled; and d) an interface with said interface connecting said slave subscriber and said address store, with said address store readable by said bus master via said slave subscriber when coupled, and with said bus master writeable into said address store located in said bypass element of said slave subscriber;

wherein said bypass elements comprise a passive circuit arrangement.

6. The coupling arrangement as claimed in claim 5; further comprising forward and return channels disposed connecting said bypass elements.

7. The coupling arrangement as claimed in claim 5; further comprising:

a) a reception line connecting each of said slave subscribers and said bypass elements;

b) a transmission line connecting each of said slave subscribers and said bypass elements; and c) a control line connecting each of said slave subscribers and said bypass elements, with said control line passing a coupling or a decoupling signal to said bypass element.

* * * * *